United States Patent [19]

Shimizu et al.

[11] 3,951,896
[45] Apr. 20, 1976

[54] AMIDO-CONTAINING RESINS AND COMPOSITIONS CONTAINING THE SAME

[75] Inventors: Katsuhisa Shimizu, Otokuni; Masaru Ori, Osaka; Osamu Oseto, Suita, all of Japan

[73] Assignee: Arakawa Rinsan Kagaku Kogyo Kabushiki Kaisha, Osaka, Japan

[22] Filed: Nov. 11, 1974

[21] Appl. No.: 522,691

[52] U.S. Cl. .......................... 260/29.7 R; 162/168; 162/169; 260/29.6 R; 260/29.6 AN; 260/29.6 XA; 260/29.7 NR; 260/29.6 NR; 260/29.7 RP; 260/29.7 EM; 260/78.4 R; 260/78.4 D; 260/78.4 E; 260/78.4 N; 260/80 P; 260/82.3; 260/83.3; 260/83.5; 260/88.7 A; 260/88.7 B; 260/93.1; 260/94.7 N; 260/89.7 R; 526/15; 526/49; 526/50; 526/280
[51] Int. Cl.² .................. C08L 23/00; C08F 18/14; C08G 63/00; C08F 6/00
[58] Field of Search .................. 260/78.4 N, 78.4 R, 260/78.4 E, 78.4 D, 82, 86.1, 89.3, 93.1, 94.7 N, 29.6 R, 80 P, 89.7 R, 89.5, 88.7 A, 78.5 BB, 78.5 R, 78.5 T, 82.3, 83.3, 83.5, 88.7 B, 29.6 NR, 29.6 XA, 29.7 XP, 29.7 R, 29.6 AN, 29.7 EM

[56] References Cited
UNITED STATES PATENTS

| | | | |
|---|---|---|---|
| 3,299,184 | 1/1967 | Whitworth | 260/78.4 R |
| 3,364,191 | 1/1968 | Donaldson | 260/93.7 |
| 3,554,886 | 1/1971 | Colomb et al. | 260/89.3 |
| 3,836,509 | 9/1974 | Columb et al. | 260/89.3 |

Primary Examiner—Joseph L. Schofer
Assistant Examiner—Herbert J. Lilling
Attorney, Agent, or Firm—Bierman & Bierman

[57] ABSTRACT

An amido-containing resin which comprises an aminolysis reaction product of
A. a reaction product of (a) a benzene compound and (b) an alicyclic compound, and
B. an amino-containing compound, said aminolysis reaction product containing one amido group and one carboxylate group in the molecule; compositions containing the above amido-containing resin which are particularly useful for sizing agent and emulsifier for producing synthetic rubbers by emulsion polymerization.

17 Claims, No Drawings

AMIDO-CONTAINING RESINS AND COMPOSITIONS CONTAINING THE SAME

This invention relates to novel resins and compositions containing the same. More particularly, the invention relates to novel amido-containing resins and compositions useful as sizing agents for paper making and emulsifiers for the emulsion polymerization of synthetic rubbers.

Conventionally, rosin and its derivatives have been employed not only as emulsifiers for synthetic rubbers and sizing agents for paper making but also as tackifiers for pressure sensitive adhesives, hotmelt compositions and various rubbers and as resins for coating composition and printing inks.

For example, an alkali salt of the rosin derivative obtained by the disproportionation or hydrogenation of rosin to make the conjugated double bond inactive is extensively used as emulsifiers for emulsion polymerization in producing styrene-butadiene rubber, acrylonitrile-butadiene-styrene rubber and like synthetic rubbers, because it has the characteristics of promoting the polymerization reaction and improving the tackiness and processability of the resulting synthetic rubbers.

Furthermore, when an alkali salt of rosin or rosin derivative such as fortified rosin is added in a small amount to a pulp suspension in paper making process, such compound imparts writing property and sizing effect to the paper obtained. Thus rosin and its derivatives are widely used as essential additives in the paper making industry.

However, since it is a naturally occuring material, its supply is not stable and there is no possibility of increase in the production. Accordingly, it has become an important problem to synthesize resins having properties similar to those of rosin and its derivatives.

A main object of the invention is to provide a novel resin having properties and characteristics similar to those of rosin and usable as a substitute for rosin as well as derivatives thereof.

Another object of the invention is to provide a composition containing novel rosin-like resins which can be used for a wide variety of purposes as substitutes for compositions containing rosin or its derivatives, such as emulsifiers for producing synthetic rubber by emulsion polymerization, sizing compositions for paper and the like.

Another object of the invention is to provide a sizing composition for paper, which displays more excellent sizing effect as compared not only with conventional rosin sizes but also with fortified rosin sizes.

Another object of this invention is to provide an emulsifying composition for producing synthetic rubber by emulsion polymerization, which is similar to or superior to conventional emulsifiers containing disproportionated rosin.

These and other advantages and objects of the present invention will be apparent from the following description.

The amido-containing resin of the present invention comprises an aminolysis reaction product of
A. a reaction product of (a) a benzene compound having the formula

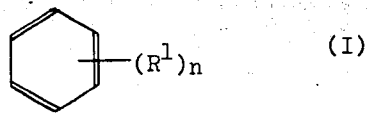

wherein $R^1$ is an alkyl group having 1 to 18 carbon atoms and $n$ is zero or an integer of 1 to 5 and (b) an alicyclic compound having the formula

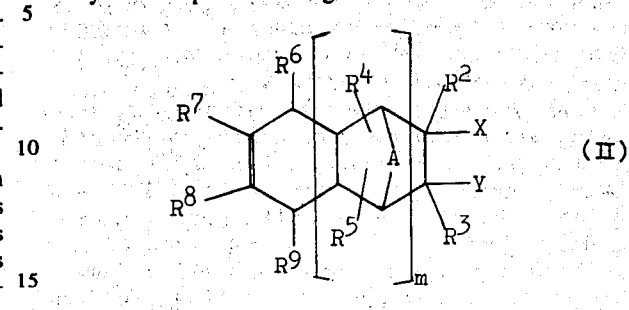

or

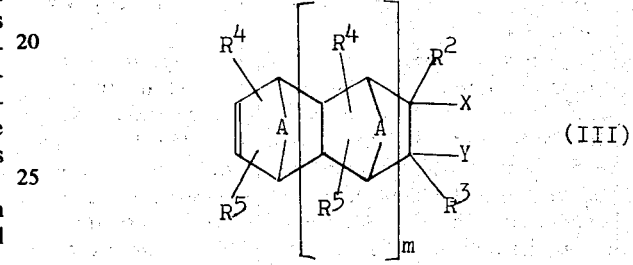

wherein each of $R^2$, $R^3$, $R^4$ and $R^5$ is a hydrogen atom or methyl group, each of $R^6$, $R^7$, $R^8$ and $R^9$ is a hydrogen atom or alkyl group having 1 to 4 carbon atoms, one of X and Y is —COOH and the other is —COOR$^a$ or X and Y as bonded together represent an acid anhydride ring, $R^a$ being an alkyl group having 1 to 4 carbon atoms, A is —CH$_2$— or —CH$_2$CH$_2$—, and $m$ is zero or an integer of 1 or 2, and B. an amino-containing compound having the formula

wherein each of $R^{10}$ and $R^{11}$ is a hydrogen atom or alkyl group having 1 to 6 carbon atoms or cyclohexyl group or $R^{10}$ and $R^{11}$ as bonded together with nitrogen atom represent a morpholino group or piperidino group.

The resin of the invention contains in the molecule —CONR$^{10}$R$^{11}$ and —COONH$_2$R$^{10}$R$^{11}$ formed by aminolysis and neutralization reactions between the reaction product (A) and amino-containing compound (B), $R^{10}$ and $R^{11}$ being the same as above.

That is to say, by the reactions the reactive radicals X and Y contained in the reaction product (A) are converted to —CONR$^{10}$R$^{11}$ and —COONH$_2$R$^{10}$R$^{11}$ to produce the present amido-containing resin, X, Y, R$^{10}$ and R$^{11}$ being the same as above.

The present amido-containing resin is easily dispersible in water to produce stable aqueous dispersion which is useful as sizing agent for paper making and emulsifying agent for emulsion polymerization in producing synthetic rubbers.

When used as a sizing agent, the present invention exhibits excellent sizing effect superior to that obtained by fortified rosin sizes which have been most extensively used.

There is no need to use the present resin in combination with rosin sizes unlike known petroleum resin sizes. Especially, the present resin has the surprising advantage that it gives excellent sizing effect even when used in a very small amount or in hard water. This effect can not be expected from alkali metal salts of the reaction products (A) containing no amido group whose sizing effect markedly reduces when used in a very small amount or in hard water.

The present resin is prepared by reacting the reaction compound (A) with amino-containing compound (B) to convert the reactive radicals X and Y contained in the compound (A) into —$CONR^{10}R^{11}$ and —$COONH_2R^{10}R^{11}$, X, Y, $R^{10}$ and $R^{11}$ being the same as defined before.

The starting reaction product (A) is disclosed in the assignee's copending application Ser. No. 445,099 filed Feb. 25, 1974 and is a product obtained by Friedel-Crafts reaction of benzene compound (a) having the formula (I) and alicyclic compound (b) having the formula (II) or (III).

The benzene compounds (a) to be used for producing the reaction product (A) are those having the formula (I) above. Examples thereof are benzene, toluene, xylene, ethylbenzene, methylethylbenzene, cumene, cymene, trimethylbenzene, tetramethylbenzene, butylbenzene, hexylbenzene, octylbenzene, dodecylbenzene and the like. Of these preferable are those having the formula (I) in which $n$ is zero or an integer of 1 or 2.

The alicyclic compounds (b) having the formula (II) or (III) to be used for the preparation of the reaction product (A) are known compounds and can be easily prepared by conventional Diels-Alder reaction. According to one of the preferred methods $\alpha,\beta$-unsaturated dibasic acid derivatives having the formula

(V)

wherein $R^2$ and $R^3$ are the same as above and each of X' and Y' is —COOH, —COOR$^a$ or —CN or X' and Y' as bonded together represent an acid anhydride ring are reacted with conjugated dienes having the formula

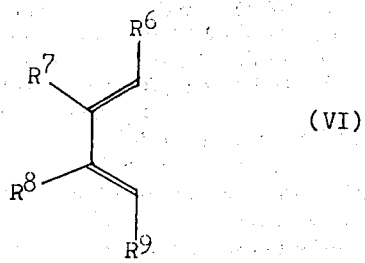

(VI)

or

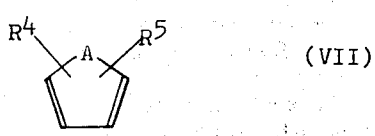

(VII)

wherein $R^4$ or $R^9$ are the same as defined above to produce alicyclic compounds (b) having the formula

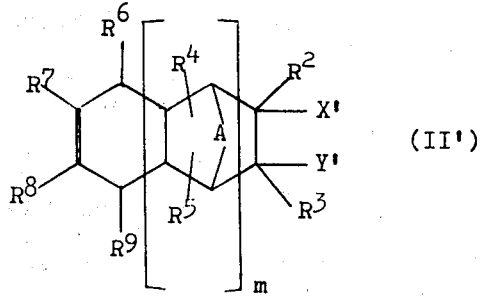

(II')

or

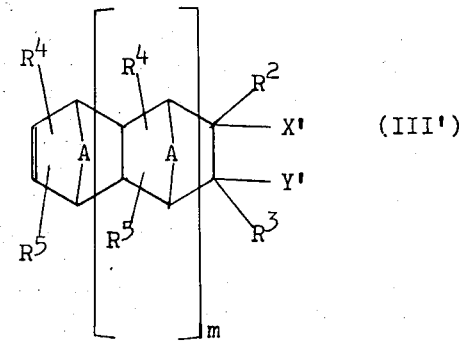

(III')

wherein $R^2$ to $R^9$, A, X', Y' and m are the same as defined above, followed by conventional modification reaction when the groups represented by X' and Y' are different from those represented by X and Y to convert the former groups to the latter groups. The modification reaction includes, for example, ring closure reaction, hydrolysis reaction and esterification reaction. For example, when the compound contains two carboxyl groups as X and Y, it is converted to acid anhydride by ring closure reaction or to half ester by esterification reaction. When the compound contains two ester groups (—COOR$^a$, R$^a$ being the same as defined above) as X' and Y', it is converted to half ester by hydrolysis reaction. When the compound contains two nitrile groups as X' and Y', it is converted to acid anhydride or half ester by ring closure or esterification reaction after converted to dicarboxylic acid by hydrolysis. These ring closure, hydrolysis and esterification reactions can be conducted in conventional manner known in the art.

Examples of the methods for producing alicyclic compounds (II') and (III') are as follows:

1. Alicyclic compounds having the formulas (II') and (III') in which $m$ is zero can be prepared by equimolar Diels-Alder addition reactions of $\alpha,\beta$-unsaturated dibasic acid derivatives with conjugated dienes as shown by the following equations:

i) 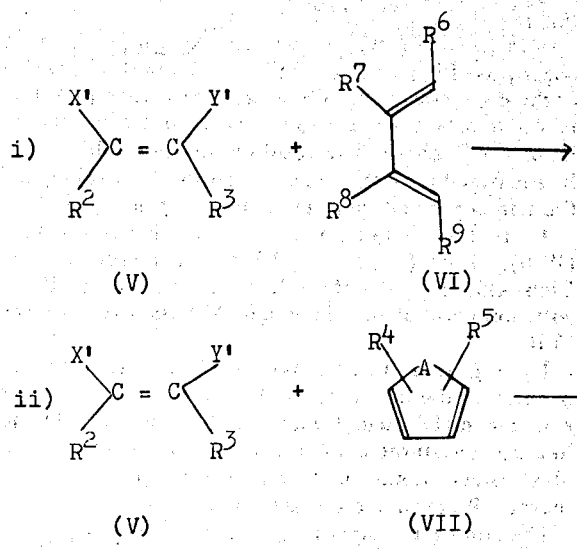

ii) 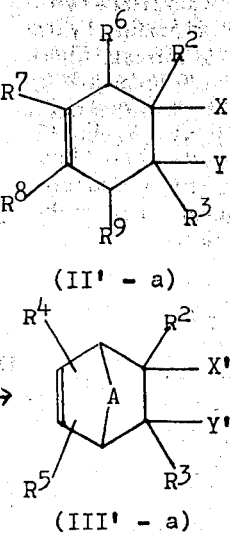

wherein $R^2$ to $R^9$, X', Y' and A are the same as defined before.

The Diels-Alder reaction (I) or (ii) of α, β-unsaturated dibasic aid derivatives (V) with conjugated acyclic dienes (VI) or with conjugated cyclic dienes (VII) is usually conducted in an open or closed reactor at a temperature of 10° to 250°C, preferably 10° to 200°C. The reaction is preferably carried out in inert gas atmosphere such as nitrogen under atmospheric, autogenous or increased pressure.

The α,β-unsaturated dibasic acid derivative (V) is preferably used in an amount of 0.5 to 2.0 moles per mole of the conjugated diene (VI) or (VII). If necessary, organic solvents such as benzene, toluene, xylene, n-hexane, cyclohexane, etc., can be employed. The reaction is usually completed within 5 minutes to 20 hours depending on the reaction conditions applied. The resulting 1 : 1 molar addition product (II'-a) or (III'-a) can be separated from the reaction mixture by distilling off the unreacted materials and solvents, if any. Further, the product (II'-a) or (III'-a) itself can be isolated by distillation under reduced pressure.

2. Alicyclic compounds having the formula (II') in which m is 1 can be prepared by equimolar Diels-Alder addition reaction of addition products (III'-a) obtained by the method (1) above with conjugated acyclic dienes as shown by the following equation:

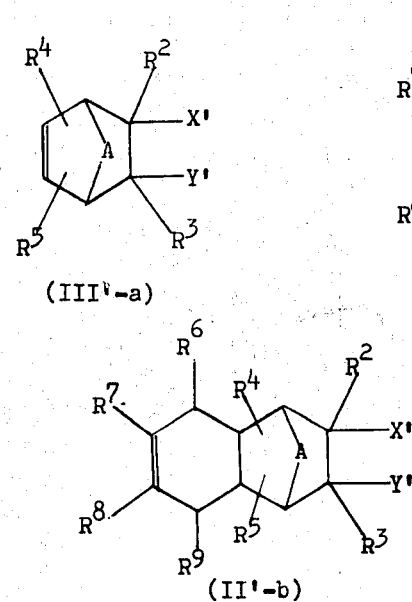

wherein $R^2$ to $R^9$, A, X' and Y' are the same as defined before.

The above Diels-Alder reaction between addition product (III'-a) and conjugated acyclic diene (VI) is usually conducted in a closed reactor at a temperature of 100° to 300°C, preferably 150° to 250°C. Inert gas atmosphere such as nitrogen is preferable and autogenous or increased pressure is applicable. The conjugated acyclic diene (VI) is used in an amount of 0.5 to 2.0 moles per mole of the addition product (III'-a). If necessary, organic solvents can be used. The reaction is usually completed within 0.5 to 10 hours depending on the reaction conditions applied. The resulting Diels-Alder addition products (II'-a) can be separated from the reaction mixture by distilling off the unreacted reactants and solvents, if any.

3. Alicyclic compounds having the formula (III') in which m is 1 can be prepared by 1 : 2 molar Diels-Alder addition reaction of α,β-unsaturated dibasic acid derivatives with conjugated cyclic dienes as shown by the following equations:

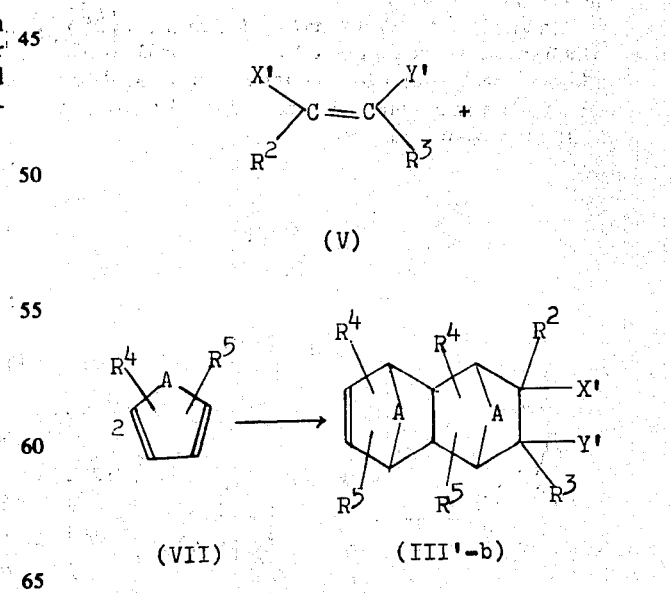

wherein $R^2$ to $R^5$, X', Y' and A are the same as defined before.

In this reaction the conjugated cyclic diene (VII) is used in an amount of 1.5 to 2.5 moles per mole of the α,β-unsaturated dibasic acid derivative (V). The reaction conditions are the same as those described in the method (2) above. The resulting addition product (III'-b) can be separated from the reaction mixture by distilling off the unreacted materials and solvents, if any.

4. Alicyclic compounds having the formula (II') in which $m$ is 2 can be prepared by equimolar Diels-Alder addition reaction of addition products (III'-b) obtained by the method (3) above with conjugated acyclic dienes as shown by the following equation.

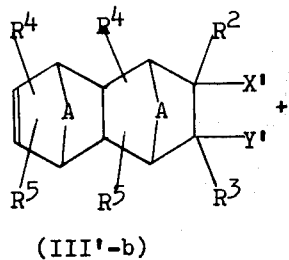

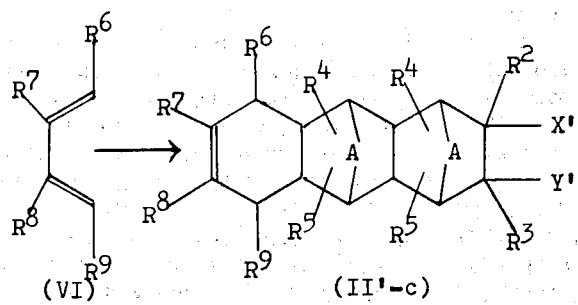

wherein $R^2$ to $R^9$, $X'$, $Y'$ and A are the same as defined before.

In this reaction the conjugated acyclic diene (VI) is used in an amount of 0.5 to 1.5 moles per mole of the addition product (III'-b). The reaction conditions are the same as described in method (2) above. The resulting reaction product (II'-c) can be separated from the reaction mixture by distilling off the unreacted materials and solvents, if any.

5. Alicyclic compounds having the formula (III') in which $m$ is 2 can be prepared by 1 : 3 molar Diels-Alder addition reaction of α,β-unsaturated dibasic acid derivatives (V) with conjugated cyclic dienes (VII) as shown by the following equation:

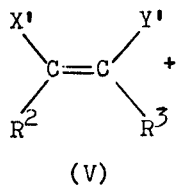

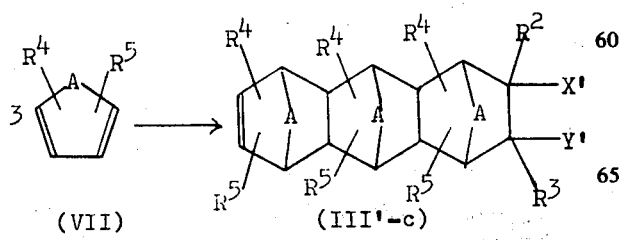

wherein $R^2$ to $R^5$, $X'$ $Y'$ and A are the same as defined before.

In this reaction the conjugated cyclic diene (VII) is usually used in an amount of 2.5 to 3.5 moles per mole of the α,β-unsaturated dibasic acid derivative (V). The reaction conditions are the same as described in the method (2) above. The resulting product (III'-c) can be separated from the reaction mixture by distilling off the unreacted materials and solvents, if any.

A mixture containing any of alicyclic compounds (II'-b), (II'-c), (III'-b) and (III'-c) may be prepared by Diels-Alder reaction of products (III'-a) and/or (III'-b) with a mixture of acyclic dienes (VI) and cyclic dienes (VII).

The α,β-unsaturated dibasic acid derivatives (V) to be used in the above methods (1) to (5) include, for example, maleic acid, fumaric acid, citraconic acid and like α,β-unsaturated dibasic acids, and mono- or dialkyl esters, mono- or di-nitriles and acid anhydrides thereof. Preferable are maleic anhydride.

The conjugated dienes to be used include conjugated acyclic dienes (VI) and conjugated cyclic dienes (VII). Examples of the former are butadiene, 2-methyl-1,3-butadiene (isoprene), 1,3-pentadiene (piperylene), 2-methyl-1,3-pentadiene, 1,3-hexadiene, 2,4-hexadiene, 2,4-heptadiene, etc. Examples of the latter are cyclopentadiene, methylcyclopentadiene, 1,3-cyclohexadiene, etc. Of these preferable are butadiene, isoprene, piperylene cyclopentadiene and methylcyclopentadiene. Dimers or codimers of these dienes, such as dicyclopentadiene, which produce the corresponding mono-dienes under the reaction conditions are also employable. These conjugated dienes can be used alone or in admixture with one another. For example, petroleum fractions obtained by cracking of naphtha and containing these dienes in mixtures can be used for the purpose.

In the Friedel-Crafts reaction to produce the present resin the starting addition products (II) and (III) can be used in a purified form or crude form obtained merely by removing unreacted materials and solvents, if any, from the reaction mixture. Preferable addition products are those having the formula of

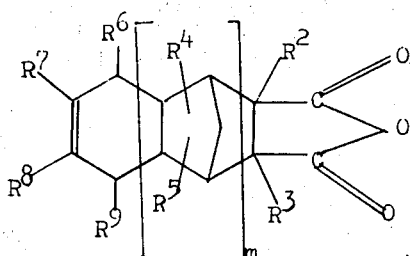

and

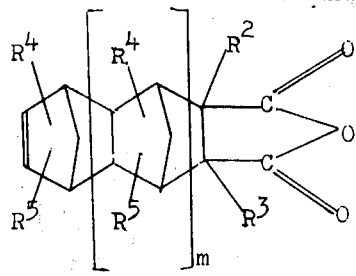

wherein $R^2$ to $R^9$ and $m$ are the same as defined before. The most preferable are those having the formulas of

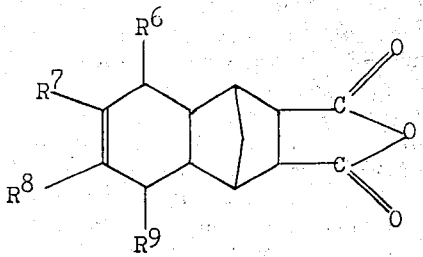

and

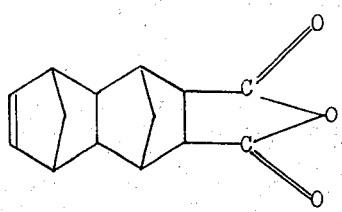

wherein $R^6$ to $R^9$ are the same as defined before.

Another starting material for producing reaction product (A), namely, benzene compound (a) having the formula (I) is used alone or in mixture in an amount of more than 0.5 mole per mole of the alicyclic compound (b) having the formula (II) or (III) to be used. Since the benzene compound (a) serves as a solvent in the reaction, it can be employed in a large excess amount, e.g., 20 moles per mole of the alicyclic compound (b). Preferable amount of the benzene compound (a) is in the range of 3 to 10 moles per mole of the alicyclic compound.

The reaction between the benzene compound (a) and alicyclic compound (b) to produce the resin is carried out in the presence of a Friedel-Crafts catalyst. The Friedel-Crafts catalysts to be used are those conventional in the art and include, for example, hydrogen fluoride, phosphoric acid, sulfuric acid, boron trifluoride, boron trifluoride-etherate, boron trifluoride-phenolate, aluminum trichloride, aluminum tribromide, tin tetrachloride, zinc chloride, activated clay, silica-alumina, etc. Preferable are sulfuric acid, boron trifluoride, boron trifluroride-etherate, boron-phenolate and aluminum trichloride. The amount of the catalyst to be used may vary over a wide range depending on the catalyst, starting materials, reaction conditions and the like, but usually it is in the range of 0.5 to 100 wt.%, based on the weight of the starting alicyclic compound (b).

The Friedel-Crafts reaction to produce the present resin is carried out in an open or closed reactor at a temperature of 0° to 300°C, preferably at 20° to 200°C. If necessary, the reaction may be conducted in an inert gas atmosphere such as nitrogen. Although increased pressure is applicable, the reaction is usually conducted under atmospheric or autogenous pressures. The reaction is usually completed within 1 to 10 hours.

After the completion of the reaction, the catalyst used is inactivated with water, acid or alkali and removed by filtration and/or washing with water. Thereafter, the reaction mixture is distilled to remove unreacted substances and solvents, if any, whereby the reaction product (A) is obtained as a residue.

The reaction product (A) thus obtained is resinous and is a 1 : 1 molar reaction product of the starting benzene compound (a) and alicyclic compound (b) and has groups represented by X and Y contained in the latter starting materials, but the exact structure thereof has not been made clear yet, since various reactions are involved depending on the starting materials used, catalysts used, etc. Usually alkylation reaction proceeds selectively.

Further, the product (A) may contain a small amount of a 1 : 2 molar reaction product of benzene compound (a) and alicyclic compound (b), depending on the reaction conditions.

The reaction product (A) thus obtained is then reacted with an amino-containing compound (B) having the formula (IV) to produce the desired amido-containing resin of the present invention. The amino-containing compounds (B) to be used include ammonia, primary amines and secondary amines. Examples of the amines are methylamine, ethylamine, propylamine, butylamine, tertiarybutylamine, hexylamine, cylcohexylamine, dimetylamine, diethylamine, methylethylamine, dipropylamine, morpholine, piperidine, etc. Of these preferable are ammonia and primary amines. Further employable are ammonium acetate, urea and like compounds capable of producing ammonia under the reaction conditions. The amount of amino-containing compound (B) to be used is not critical, but preferably it is used in an equimolar amount to the addition product (A) or in an excessive amount. The reacton can be carried out in the presence or absence of organic solvents, such as benzene, toluene, xylene, tetrahydrofuran, dioxane, ethyl acetate, diethylether, dichloroethane, etc. The reaction temperature is variable over a wide range, depending on the kind of amino-containing compound (IV) to be used, but usually in the range of $-30°$ to 250°C. When compounds capable of producing ammonia are used, the reaction is conducted at a temperature higher than decomposition temperature thereof for producing ammonia therefrom. The reaction is preferably conducted at atmospheric pressure, but increased pressure is also applicable.

The reaction between the reaction product (A) and amino-containing compound (B) involves neutralization and aminolysis reactions, which produce the desired amido-containing resin having one carboxyl group neutralized with ammonia or amine ($—COONH_2R^{10}R^{11}$) and one amido group ($—CONR^{10}R^{11}$).

The present amido-containing resin can be used for a wide variety of purposes as substitutes for rosin or its derivatives, such as sizing composition for paper making, emulsifiers for producing synthetic rubber by emulsion polymerization, etc.

The sizing composition, for example, can be easily prepared by dispersing the present resin in water. If necessary, the resin may be converted into alkali metal salt by salt exchange reaction with sodium hydroxide, potassium hydroxide and like alkali metal hydroxide. The sizing composition can display excellent sizing effect without further addition of rosin sizes unlike petroleum resin sizes, but if desired, rosin sizes as well as petroleum resin sizes can be used in combination therewith. The sizing composition of the invention can be employed in known manner conventional for rosin sizes and petroleum resin sizes.

The emulsifying composition is also in the form of aqueous dispersion containing the present resin dispersed in water and is applicable to produce various synthetic rubbers by emulsion polymerization, examples of the synthetic rubbers being styrene-butadiene rubber, acrylonitrile rubber, chloroprene rubber, polybutadiene rubber, acrylonitrile-butadiene rubber, etc. The resin has a good water-solubility at low temperature and the aqueous dispersion thereof is excellent in storage stability at low temperature, so that the emulsifying composition containing the same can be effectively used for producing cold rubber.

For a better understanding of the invention examples are given below.

EXAMPLE 1

1. Preparation of reaction product (A-1)

225 g of dicyclopentadiene (3.4 moles as cyclo-pentadiene), 167 g (1.7 moles) of maleic anhydride and 392 g of xylene were placed into a 1-liter stainless steel autoclave with an electromagnetic stirrer, and the interior air was replaced by nitrogen gas. The mixture was thereafter heated to 220°C and kept with stirring at that temperature for 3 hours.

The resulting reaction mixture was subjected to distillation to remove xylene, unreacted dicyclopentadiene and 1 : 1 molar addition product

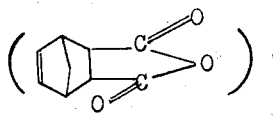

of cyclopentadiene/maleic anhydride and to obtain 254 g of a distillate at 190° to 220°C/2 mm Hg, which was found to be a 2 : 1 molar addition product

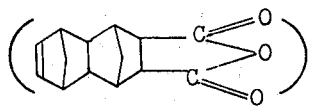

of cyclopentadiene/maleic anhydride having an acid value of 470 (theoretical acid value 488).

230 g of the above-mentioned addition product and 460 g of xylene were placed into a 1-liter four-necked flask having a stirrer and thermometer. After dissolving the mixture uniformly, 4.6 g of boron trifluoride-phenolate was slowly added to the solution, and the resulting mixture was reacted at 80°C for 3 hours. To the reaction mixture thereafter cooled was added 13.8 g of a mixture of water and calcium hydroxide (1:3 in weight ratio) to inactivate the catalyst. The inactivated catalyst was then removed by filtration. Unreacted substances and xlene were distilled off from the filtrate to obtain 277 g of a resinous reaction product (A-1) having a softening point of 88°C and an acid value of 327 (theoretical value: 334).

2. Preparation of amido-containing resin

Into a 100-ml four-necked flask equipped with a stirrer and ammonia gas inlet tube was placed a solution of 10 g of the resulting resinous product (A-1) dissolved in 50 g of benzene. Introduction of ammonia gas at 20° to 25°C immediately produced a white precipitate. After supplying ammonia gas for 30 minutes, the reaction mixture was filtered and dried at room temperature at a reduced pressure to obtain 11.0 g of amido-containing resin in the form of white powder. The infrared absorption spectrum of the powder showed absorptions at 805 and 1,600 cm$^{-1}$ due to the presence of the aromatic ring, at 1,400 and 1,540 cm$^{-1}$ due to the presence of —COONH$_4$, and at 1,650 and 3,200 cm$^{-1}$ due to the presence of —CONH$_2$.

EXAMPLE 2

Into a 100-ml four-necked flask equipped with a stirrer and a dropping funnel were placed 10 g of the resinous product (A-1) obtained in Example 1 and 50 g of ethyl acetate, which were dissolved uniformly. 4.5 g of diethylamine was thereafter added dropwise to the solution over a period of 15 minutes, and the mixture was further reacted for 1 hour with stirring. After the completion of reaction, unreacted substances and solvent were distilled off at a reduced pressure to obtain 14.8 g of amido-containing resin. Infrared absorption spectrum analysis indicated the presence of carboxylate group and —CON(C$_2$H$_5$)$_2$.

EXAMPLE 3

12.9 g of amido-containing resin was obtained in the same manner as in Example 2 except that 4.5 g of diethylamine was replaced by 3.4 g of n-propylamine. Infrared absorption spectrum revealed the presence of —CONH(C$_3$H$_7$) and carboxylate group.

EXAMPLE 4

1. Preparation of reaction product (A-2)

Into a 1-liter flask were placed 200 g of methanol and 50 g of the 2 : 1 molar addition product of cyclopentadiene/maleic anhydride obtained in Example 1, which were reacted at the reflux temperature for 2 hours. The resulting reaction mixture was distilled to remove the methanol to obtain 56.5 g of half methyl ester

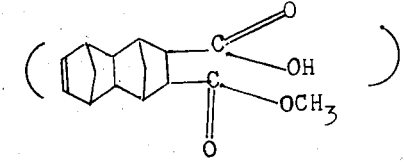

of the above-mentioned addition product.

50 g of the half ester thus obtained and 200 g of xylene were placed into a four-necked flask and dissolved uniformly. 8.5 g of boron trifluoride etherate was further added slowly. The mixture was then reacted at 80°C for 3 hours. The resulting mixture was cooled, and water was added thereto to decompose the catalyst, followed by filtration to remove precipitate and washing with water. Unreacted substances were distilled off from the xylene layer at a reduced pressure to obtain 46.6 g of a resinous reaction product (A-2) having a softening point of 89°C and an acid value of 142 (theoretical value : 152). Infrared absorption spectrum indicated absorptions at 1,705 cm$^{-1}$ due to the presence of —COOH and at 1,740 cm$^{-1}$ due to the presence of —COOCH$_3$.

2. Preparation of amido-containing resin

Into a 200-ml autoclave was placed 62.4 g of methanol solution of 10 g of the resulting resinous product (A-2) and 2.4 g of dimethylamine, and the interior air was replaced by nitrogen gas. The solution was then reacted at 150°C for 8 hours. After the reaction, methanol and unreacted substances were distilled off at a reduced pressure to obtain 11.2 g of a resin. Infrared absorption spectrum showed no absorption due to the presence of —COOCH$_3$ but indicated absorption due to the presence of —CON(CH$_3$)$_2$.

EXAMPLE 5

1. Preparation of reaction product (A-3)

Into a 1-liter four necked flask were placed 200 g of cumene and 50 g of the 2 : 1 molar addition product of cyclopentadiene and maleic anhydride obtained in Example 1. 14.6 g of 97% sulfuric acid was slowly added dropwise to the mixture with stirring while maintaining the mixture at 50°C, followed by heating to 110°C for 3 hours to complete reaction. After the reaction, the reaction mixture was cooled and washed with water to remove the catalyst. Unreacted substances were distilled off at a reduced pressure to obtain 55.6 g of resinous reaction product (A-3) having a softening point of 80.5°C and a saponification value of 286.5.

2. Preparation of amido-containing resin

The resulting resinous product (A-3) was reacted with ammonia in the same manner as in Example 1 to obtain amido-containing resin. Infrared absorption spectrum showed the presence of acid amide group and carboxylate group.

EXAMPLE 6

1. Preparation of reaction product (A-4)

588 g of maleic anhydride and 990 g of benzene were placed into a three-liter four-necked flask equipped with a reflux condenser, dropping funnel and thermometer. While keeping the mixture at a temperature of 30° to 40°C with stirring, 396 g of cyclopentadiene was added dropwise to the mixture over a period of 2 hours. Subsequently, the resulting mixture was heated to 80°C, maintained for 30 minutes at this temperature and then cooled. Removal of unreacted substances gave 868 g of 1 : 1 molar addition product of a cyclopentadiene and maleic anhydride, which had an acid value of 668 (theoretical value : 684).

To a 1-liter autoclave were placed 280 g of 20° to 38°C fraction of thermally cracked naphtha having the following composition and 250 g of the resulting addition product, and the interior air was replaced by nitrogen gas. The mixture was then reacted at 250°C for 5 hours. After the completion of reaction, the mixture was cooled and distilled at a reduced pressure to remove unreacted substances and a fraction at 150°C/1-2 mm Hg or lower and to thereby obtain 301 g of addition product, which was 1 : 1 molar addition product of the above cyclopentadiene-maleic anhydride addition product and conjugated dienes shown below. The resinous product thus obtained had an acid value of 342.

The composition of naphtha used:

| | |
|---|---|
| cyclopentadiene and cis-1,3-pentadiene | 15.7 wt.% |
| isoprene | 14.1 " |
| trans-1,3-pentadiene | 8.4 " |
| others (free from conjugated dienes) | 61.8 " |

200 g of ethylbenzene and 7.3 g of anhydrous aluminum chloride were placed into a 1-liter four-necked flask. While heating the mixture at 50°C with stirring, 50 g of the above addition product in molten state was slowly added to the mixture. After the completion of addition, the resulting mixture was stirred at 80°C for 3 hours. Dilute hydrochloric acid was added to the reaction mixture obtained to decompose the catalyst, followed by filtration and washing with water. Unreacted materials were then distilled off from the ethylbenzene layer to obtain 53.0 g of a resinous reaction product (A-4) having a softening point of 74.5°C and an acid value of 272.

2. Preparation of amido-containing resin

The resulting resinous product (A-4) was reacted with ammonia in the same manner as in Example 1 to obtain amido-containing resin. Infrared absorption spectrum showed the presence of acid amido group and carboxylate group.

The resins obtained in the above Examples 1 to 6 were tested in respect of their applications as sizing compositions and as emulsifiers for emulsion polymerization of synthetic rubbers according to the following methods with the results given below.

Each of the amido-containing resins obtained in Examples 1 to 6 was dispersed in water to a concentration of 30 wt.% and the dispersion was adjusted to a pH of 10 with a small amount of a caustic soda. For comparison each of resinous products (A-1), (A-2), (A-3) and (A-4) obtained in Examples 1, 4, 5 and 6, rosin and fortified rosin was neutralized with potassium hydroxide in an amount equivalent to the acid value of the resin to prepare a 25 wt.% aqueous solution thereof.

1. Sizing composition and sizing effect

Each of the compositions obtained above was used as a sizing agent for paper making. A specified amount of the sizing composition was added to a 1 wt.% slurry of pulp (LBKP) having a beating degree of 30° SR. An aqueous solution of aluminum sulfate was further added to and uniformly dispersed in the slurry in an amount of 2.5 wt.% based on the dry pulp an calculated as solid. Using a TAPPI Standard Sheet Machine, the resulting slurry was made at 20°C into paper weighing 65 ± 1 g/m². The paper was dried at 100°C for 5 minutes and conditioned at 20°C and 65% RH. The sizing effect given to the paper was determined according to Stockigt method (JIS P 8122).

The same procedure as above was followed except that calcium chloride was added to the pulp slurry in such amount as to give German hardness of 15° to determine the sizing effect imparted to paper made using hard water. The test results are given in Table 1.

Table 1

| Sizing composition | | Sizing Effect | | | |
|---|---|---|---|---|---|
| | water: | Sizing effect (in seconds) | | | |
| | | Soft water | | Hard water | |
| No. | Resin | Amount* used: (wt.%) | 0.3 | 0.5 | 0.3 | 0.5 |
| 1 | Example 1 | | 25.5 | 31.2 | 25.1 | 30.2 |
| 2 | Example 2 | | 26.0 | 31.1 | 25.0 | 29.8 |
| 3 | Example 3 | | 26.2 | 31.5 | 25.7 | 30.6 |
| 4 | Example 4 | | 26.4 | 32.5 | 25.8 | 30.3 |
| 5 | Example 5 | | 25.4 | 31.0 | 25.0 | 30.5 |
| 6 | Example 6 | | 24.3 | 29.6 | 24.0 | 29.1 |
| 7 | Comparison A-1 | | 28.3 | 33.5 | 5.4 | 13.5 |
| 8 | Comparison A-2 | | 25.1 | 30.0 | 7.3 | 14.5 |
| 9 | Comparison A-3 | | 25.7 | 29.4 | 3.3 | 12.5 |
| 10 | Comparison A-4 | | 26.0 | 31.0 | 2.0 | 8.5 |
| 11 | Rosin | | 20.5 | 27.3 | 20.0 | 26.7 |
| 12 | Fortified rosin | | 24.3 | 29.2 | 24.1 | 28.9 |

Note:
*The amount of sizing composition is percent in solid weight, based on the pulp.

Table 1 shows that the sizing compositions of this invention produce better results than rosin sizing composition and are equivalent or superior to the fortified rosin sizing composition under paper making conditions using hard water as well as soft water.

2. Emulsifying composition

Each of the aqueous compositions of the resin obtained in Examples 1 and 2 was used as an emulsifier for emulsion copolymerization of styrene and butadiene according to cold rubber sulfoxylate formulation shown in Table 2. A commercial disproportionated rosin emulsifier was also tested for comparison in the same manner. The conversion and stability of latex are respectively shown in Tables 3 and 4.

Table 2

| Materials used | Names of materials used | Proportions parts by weight |
|---|---|---|
| Monomer | Butadiene | 70 |
| | Styrene | 30 |
| Dispersing medium | Deionized water (degassed) | 200 |
| Emulsifier | Aqueous solution of resin of Examples (as solid) | 4.0 |
| | Naphthalene-formaldehyde resin sodium sulfonate | 0.15 |
| Molecular weight adjusting agent | Tertiary dodecylmercaptan | 0.1 |
| Polymerization initiator | | |
| Oxidizing agent | p-Menthane hydroperoxide | 0.08 |
| Reducing agent | Ferrous sulfate (heptahydrate) | 0.0125 |
| Secondary reducing agent | Sodium formaldehyde sulfoxylate | 0.15 |
| Chelating agent | EDTA - 4Na | 0.07 |
| Electrolyte | Sodium phosphate (dodecahydrate) | 0.8 |

POLYMERIZATION CONDITIONS

Polymerization temperature: 5°C.
Reaction time: 9 hours.
In nitrogen atmosphere.

CONVERSION

Table 3

| Emulsifier | Conversion (%) |
|---|---|
| Example 1 | 61.3 |
| Example 2 | 62.1 |
| Commercial disproportionated rosin emulsifier | 61.5 |

STABILITY TEST OF LATEX 50 g of 25 wt.% aqueous solution of the latex obtained in the above polymerization was placed in a container and subjected to mechanical shearing force at a temperature of 25°C for 5 minutes, under a load of 5 kg and at a rotational speed of 1000 r.p.m. The resulting coagulation was filtered by an 80-mesh stainless screen and dried to determine the rate of the coagulation formed.

$$\text{Rate of coagulation formed}(\%) = \frac{\text{weight of coagulation dried}}{12.5} \times 100$$

The smaller the rate of coagulation formed, the more stable is the latex.

Table 4

| Emulsifier | Ratio of coagulation formed (%) |
|---|---|
| Example 1 | 1.6 |
| Example 2 | 2.0 |
| Commercial disproportionated rosin emulsifier | 1.5 |

What we claim is:

1. Amido-containing resin which consists essentially of an aminolysis reaction product of
   A. a Friedel-Grafts catalyzed reaction product of (a) a benzene compound having the formula

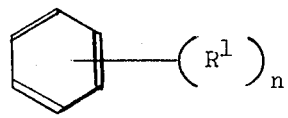

wherein $R^1$ is an alkyl group having 1 to 18 carbon atoms and $n$ is zero or an integer of 1 to 5 and (b) an alicyclic compound having the formula

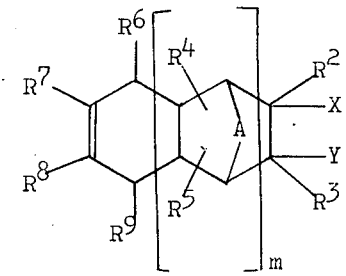

or

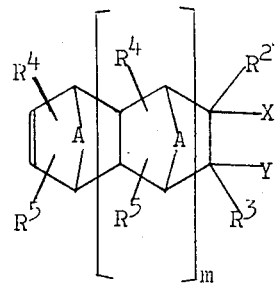

wherein each of $R^2$, $R^3$, $R^4$ and $R^5$ is a hydrogen atom or methyl group, each of $R^6$, $R^7$, $R^8$ and $R^9$ is a hydrogen atom or alkyl group having 1 to 4 carbon atoms, one of X and Y is —COOH and the other is —COO$R^a$ or X and Y as bonded together represent an acid anhydride ring, $R^a$ being an alkyl group having 1 to 4 carbon atoms, A is —CH$_2$— or —CH$_2$CH$_2$—, and $m$ is zero or an integer of 1 or 2, and B. an amino-containing compound having the formula

wherein each of $R^{10}$ and $R^{11}$ is a hydrogen atom, alkyl group having 1 to 6 carbon atoms or cyclohexyl or $R^{10}$ and $R^{11}$ as bonded together with nitrogen represent morpholino or piperidino group.

2. The amido-containing resin according to claim 1 in which said alicyclic compound has the formula of

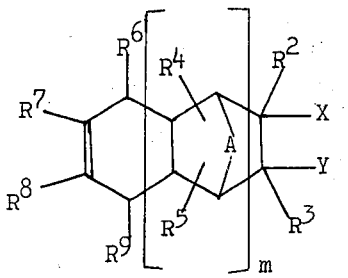

wherein each of $R^2$, $R^3$, $R^4$ and $R^5$ is a hydrogen atom or methyl group, each of $R^6$, $R^7$, $R^8$ and $R^9$ is a hydrogen atom or alkyl group having 1 to 4 carbon atoms, one of X and Y is —COOH and the other is —COO$R^a$ or X and Y represent an acid anhydride ring formed by being bonded together, $R^a$ being alkyl group having 1 to 4 carbon atoms, A is —CH$_2$— or —CH$_2$CH$_2$—, and $m$ is zero or an integer of 1 or 2.

3. The amido-containing resin according to claim 1 in which said alicyclic compound has the formula of

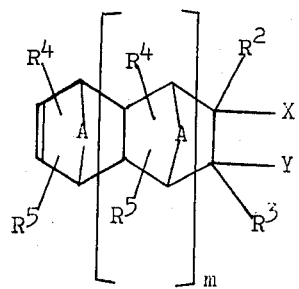

wherein each of $R^2$, $R^3$, $R^4$ and $R^5$ is a hydrogen atom or methyl group, one of X and Y is —COOH and the other is —COO$R^a$ or X and Y represent an acid anhydride ring formed by being bonded together, $R^a$ being an alkyl group having 1 to 4 carbon atoms, A is —CH$_2$— or —CH$_2$CH$_2$—, and $m$ is zero or an integer of 1 or 2.

4. The amido-containing resin according to claim 1 in which said X and Y contained in the formula of the alicyclic compound represent an acid anhydride ring formed by being bonded together.

5. The amido-containing resin according to claim 1 in which one of said X and Y is —COOH and the other is —COO$R^a$, $R^a$ being an alkyl group having 1 to 4 carbon atoms.

6. The amido-containing resin according to claim 1 in which said $m$ in the formula of the alicyclic compound is zero.

7. The amido-containing resin according to claim 1 in which said $m$ in the formula of the alicyclic compound is 1.

8. The amido-containing resin according to claim 1 in which said $m$ in the formula of the alicyclic compound is 2.

9. The amido-containing resin according to claim 2 in which said $R^2$ to $R^5$ are hydrogen atoms, X and Y represent an acid anhydride ring formed by being bonded together, A is —CH$_2$— and $m$ is 1.

10. The amido-containing resin according to claim 3 in which said $R^2$ to $R^5$ are hydrogen atoms, X and Y represent an acid anhydride ring formed by being bonded together, A is —CH$_2$— and $m$ is 1.

11. The amido-containing resin according to claim 1, in which said benzene derivative has said formula in which $n$ is zero or an integer of 1 or 2.

12. The amido-containing resin according to claim 1, in which said amino-containing compound is ammonia.

13. The amido-containing resin according to claim 1, in which said amino-containing compound is a primary amine having one alkyl group having 1 to 6 carbon atoms.

14. The amido-containing resin according to claim 1, in which said amino-containing compound is a secondary amine having two alkyl groups, each of which is one having 1 to 6 carbon atoms.

15. A composition containing the amido-containing resin claimed in claim 1.

16. A sizing composition for paper which comprises an aqueous medium having dispersed therein the amido-containing resin claimed in claim 1.

17. An emulsifying composition for producing a synthetic rubber by emulsion polymerisation which comprises an aqueous medium having dispersed therein the amido-containing resin claimed in claim 1.

* * * * *